M. C. OSTER.
TRANSMISSION MECHANISM.
APPLICATION FILED OCT. 2, 1917.
1,276,951.
Patented Aug. 27, 1918.
3 SHEETS—SHEET 2.
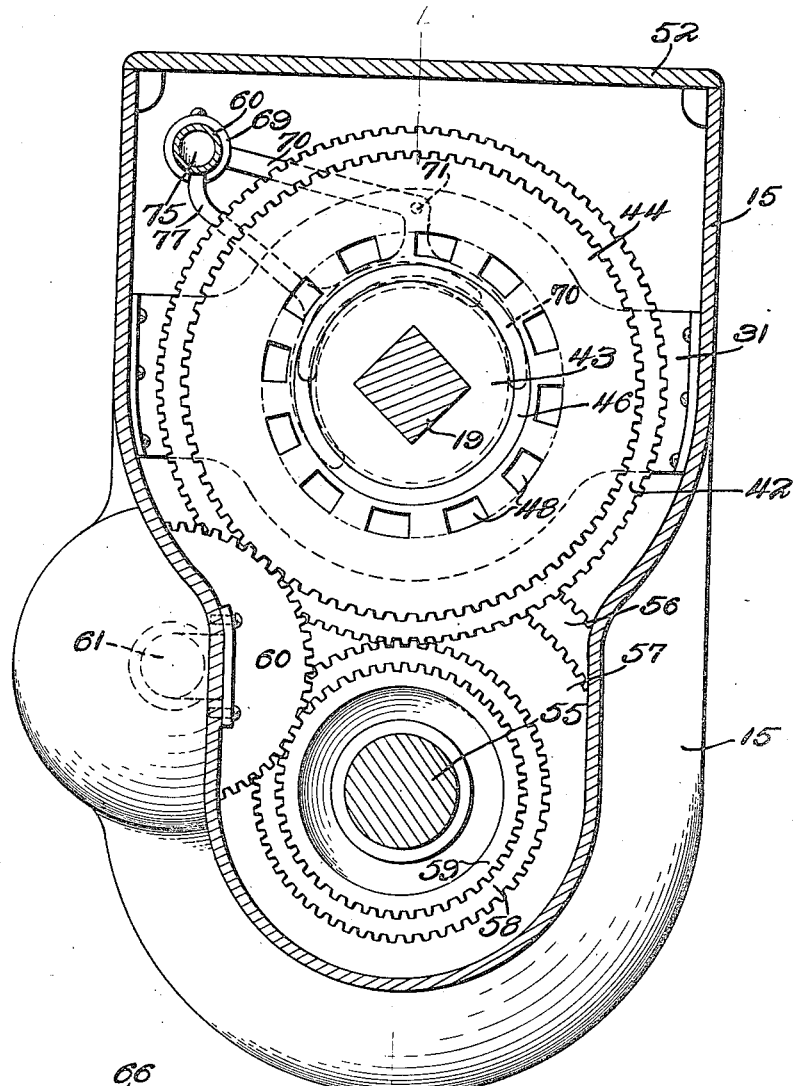
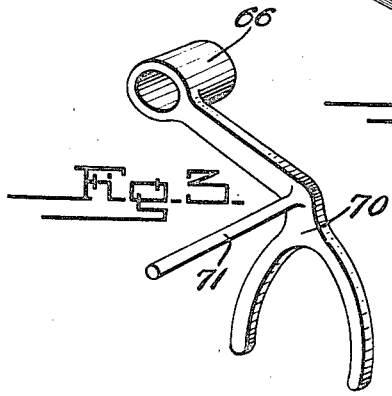
Inventor
M.C.Oster.
By Lancaster and Allwine
Attorneys

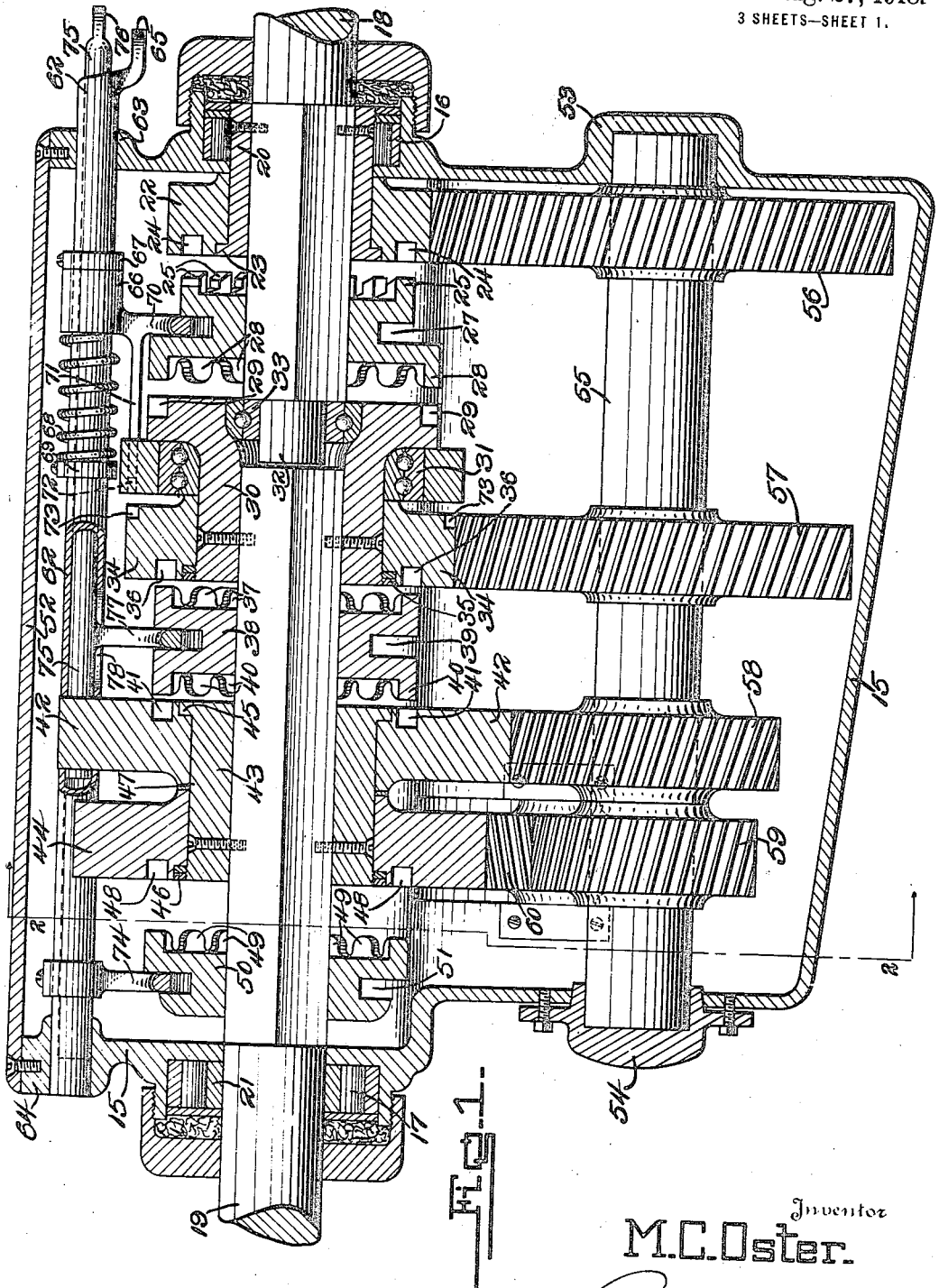

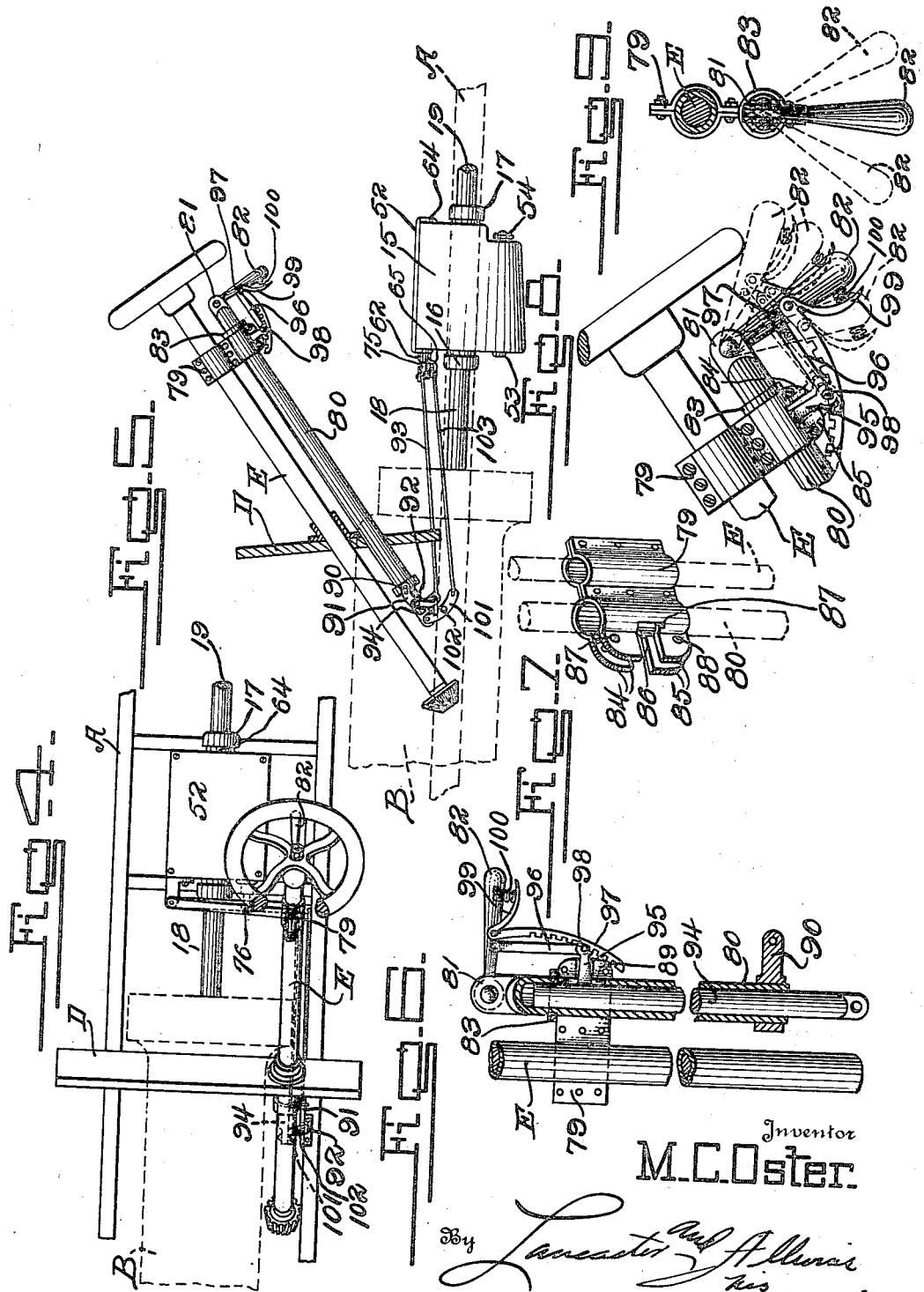

UNITED STATES PATENT OFFICE.

MATTHEW C. OSTER, OF DENTON, MONTANA.

TRANSMISSION MECHANISM.

1,276,951.  Specification of Letters Patent.  Patented Aug. 27, 1918.

Application filed October 2, 1917. Serial No. 194,330.

*To all whom it may concern:*

Be it known that I, MATTHEW C. OSTER, a citizen of the United States, residing at Denton, in the county of Fergus and State of Montana, have invented new and useful Improvements in Transmission Mechanism, of which the following is a specification.

The present invention relates to gearing, and has more particular reference to transmission mechanism adapted for use particularly in automobile, truck and the like construction.

An object of the present invention is to provide a transmission mechanism which is silent in operation; wherein the gears are constantly in mesh; wherein improved clutches are employed for locking certain of the gears to the shafting; wherein the clutches are so constructed that they may be shifted noiselessly and wherein there is no liability of breakage of the teeth thereof; wherein it is impossible to interlock the forward and reverse gears simultaneously; wherein the clutches require but a slight movement for interlocking and releasing the same, and the operating lever requires a similar slight movement; and wherein operating means is provided which may be supported upon the steering post and the connections thereof and be within easy access of the operator to shift the clutches with the least possible exertion on the part of the operator.

The above, and various other objects of this invention will be in part described, and in part understood, from the following detailed description of the present preferred embodiment, the same being illustrated in the accompanying drawings, wherein Figure 1 is a vertical longitudinal section taken through a transmission mechanism constructed according to the present invention, and substantially on the line 1—1 of Fig. 2.

Fig. 2 is a transverse section through the rear end of the transmission mechanism taken substantially on the line 2—2 of Fig. 1.

Fig. 3 is a detail perspective view of the direct shifting element employed.

Fig. 4 is a fragmentary top plan view of the chassis of a motor vehicle having the transmission mechanism of this invention applied thereto.

Fig. 5 is a side elevation of the same.

Fig. 6 is a detail fragmentary section of the operating mechanism as applied to the steering post.

Fig. 7 is a detail perspective view of the attaching bracket for securing the operating mechanism to the steering gear post.

Fig. 8 is a fragmentary enlarged side elevation of the operating handle and the adjacent parts, the dotted lines showing various positions of the operating handle and the parts connected thereto.

Fig. 9 is a top plan view of the operating handle, the dotted lines showing the several positions of the same.

Referring to these drawings, 15 designates a casing which may be made in two or more parts suitably connected together and which is provided in its upper part and at opposite ends with bearings 16 and 17 supporting respectively one end of a drive shaft 18 and an adjacent end of a driven shaft 19. The adjacent ends of the shafts 18 and 19 are preferably rectangular in cross section and may be provided with bearing sleeves 20 and 21 respectively fixed to the shafts 18 and 19 and rotatably mounted in the bearings 16 and 17.

The sleeve 20, which comprises part of the drive shaft 18, projects inwardly through the front wall of the casing 15 and rotatably supports a gear-wheel 22, the sleeve 20 having an annular outstanding flange 23 upon its inner end which is seated in the inner face of the hub portion of the gear-wheel 22 for retaining the latter upon the sleeve. The gear-wheel 22 is provided upon its inner face with a circular row of depressions 24 which register with and are adapted to receive therein the clutch teeth 25 projecting from the adjacent end of a shiftable clutch member 26 which is longitudinally slidable upon the inner end of the drive shaft 18. The clutch member 26 is in the form of a collar having a rectangular opening at its central portion through which the shaft 18 projects, and is adapted to turn with the shaft. The clutch member 26 has an annular groove 27 formed therein for a purpose which will hereinafter appear. The opposite end of the clutch member 26 is provided with a circular row of outstanding teeth 28 adapted to engage in depressions 29 formed in the adjacent end of a collar 30 rotatably mounted in an intermediate bearing 31 carried by the casing 15. The collar 30 is secured, by set screws or the like to the shaft 18 and is adapted to turn therewith. The inner end of the drive shaft 18 is reduced and rounded to form a spindle or journal 32 which is received in an axial bearing 33 positioned within the forward end of the collar 30 to support the drive shaft. The drive and driven shafts 18 and 19 are therefore mounted in co-axial alinement so that the transmission mechanism may be interposed directly in the line of drive between the motor and the mechanism to be operated.

The forward end of the collar 30 is enlarged and engages against the bearing 31 of the casing to hold the collar 31 from rearward displacement. The rear end of the collar 30 has rotatably mounted thereon a medium sized gear-wheel 34 held from longitudinal movement between the bearing 31 and an annulus 35 which is detachably secured to the rear end of the collar 30 and is of greater diameter than the same for engagement in an annular depression in the rear face of the gear-wheel 34. Screw-threads or the like are employed for holding the annulus 35 to the collar. The gear-wheel 34 is provided in its rear face with a circular row of depressions 36 adapted to receive therein the correspondingly arranged teeth 37 of a second clutch member 38, the latter being longitudinally slidable upon the driven shaft 19 and being adapted to turn therewith. The clutch member 38 is provided with an annular groove 39, and has upon its opposite end outwardly projecting teeth 40 arranged in a circular row and adapted to engage in recesses or depressions 41 formed in the forward face of a relatively large gear-wheel 42. The gear-wheel 42 is rotatable upon a sleeve 43 which is fixed to the driven shaft 19, the sleeve 43 being also provided with a reverse gear-wheel 44 rotatably mounted thereon. The forward end of the sleeve 43 is provided with an annular radial flange 45 which is seated in a correspondingly formed recess in the forward face of the gear-wheel 42 for retaining the latter from forward displacement from the sleeve. A detachable annulus 46 is secured by screw-threads or the like to the rear end of the sleeve 43, and is of greater diameter than the same and engages in a correspondingly formed recess in the rear face of the reverse gear-wheel 44. A parting ring 47 is interposed between the gear-wheels 42 and 44 to reduce frictional contact therebetween and to admit of the independent rotation of the gear-wheels upon the sleeve 43. The reverse gear-wheel 44 is provided in its rear face with a circular row of depressions or notches 48 adapted to receive therein the correspondingly arranged teeth 49 projecting forwardly from a third clutch element 50. The clutch element 50 has an annular exterior groove 51 for a purpose which will hereinafter appear, and is fitted upon the driven shaft 19 to turn therewith and capable of longitudinal sliding movement thereon.

The lower portion of the casing 15 is provided, at opposite ends, with bearings 53 and 54, the latter being preferably detachable, receiving therein the opposite ends of a counter-shaft 55, upon which are fixed gear-wheels 56, 57, 58 and 59. The gear-wheels upon the counter-shaft 55 are respectively arranged opposite to and in meshing engagement with the gear-wheels 22, 34 and 42 of the drive and driven shafts 18 and 19, and with a reverse gear-wheel or pinion 60. The pinion 60 is mounted upon a stub-shaft 61, carried in a lateral offset of the casing 15, and also meshes with the reverse gear-wheel 44. It will be noted from Fig. 1 particularly, that all of the gear-wheels are spiral gears, and that thus greater strength is secured and the running of the gears is practically noiseless. It will also be noted that the outer ends of all of the clutch teeth are rounded to move easily and silently into place in their respective depressions or notches when the clutch elements are shifted, and that the main clutch teeth 25 are beveled or inclined at their outer ends to facilitate interlocking engagement thereof with the main drive pinion 22.

The gear-wheels 56, 57, 58 and 59 are consecutively reduced in diameter from front to rear of the casing, and the bottom portion of the casing 15 is correspondingly tapered or gradually reduced in size to economize in material, space and weight. The top cover 52 of the casing is preferably detachable and held in place by screws or the like.

A hollow shifting bar 62 extends longitudinally through the casing 15 at the top thereof and is slidably mounted in bearings 63 and 64 formed in the opposite ends of the casing, the bar 62 projecting forwardly through the bearing 63 and having an attaching lug 65 on one side thereof to receive suitable mechanism hereinafter described for shifting bar 62. This hollow bar 62 is provided near its forward end with a longitudinally slidable sleeve 66 limited in its forward sliding movement by an adjustable collar 67 mounted upon the bar 62, and normally held against the collar 62 by an expansion spring 68 surrounding the bar 62 and compressed against the rear end of the sleeve 66 by a second adjustable collar 69 carried upon the rod 62. The sleeve 66 is provided with a laterally offset and depending fork 70 the arms of which engage in the annular groove 27 of the forward shifting element or member 26. The sleeve 66 is also provided with a laterally offset and rearwardly extending locking finger 71 which projects through a guide opening 72 formed in the upper part of the bearing 31 of the casing, and which is adapted to engage in depressions 73 one at a time formed in the forward face of the intermediate speed gearwheel 34, the latter having a circular row of the depressions 73 near the outer marginal edge thereof.

This hollow longitudinally shiftable bar 62 is provided upon its rear end with a rigid depending fork 74, the arms of which engage in the annular groove 51 of the third clutch member 50.

A second or inner longitudinally shiftable bar 75 is slidably mounted within the bar 62 and projects forwardly therefrom and has an attaching lug 76 on its forward end for engagement with mechanism which will be hereinafter set forth for shifting the bar 75. The bar 75 is of less length than the bar 62 and is provided near its rear end with a depending rigid fork 77 which projects through a longitudinal slot 78 formed in the under side of the bar 62, and which is longitudinally movable in the slot 78 upon the shifting of the bar 75. The rear end of the bar 75 projects beyond the rear end of the slot 78 to provide a substantial support and bearing for the bar 75.

Referring now more particularly to Figs. 4 to 10 inclusive it will be noted that the transmission mechanism may be applied to motor vehicle construction, and these figures disclose one embodiment of operating means for shifting the bars 62 and 75.

In these figures A designates the frame of a motor vehicle, B a motor mounted in the frame and having connection with the drive shaft 18, D a dashboard and E a steering column of the usual construction.

Fitted to the steering column E is a bracket 79, the same being preferably formed of a pair of opposed plates riveted or otherwise suitably secured together, and having one of their end portions engaging about the steering column and their opposite end portions projecting rearwardly therefrom and being bowed outwardly from each other for the reception of a tubular operating shaft 80 therethrough. The tubular shaft 80 is adapted to extend in substantially parallel relation with the steering column D and projects downwardly through the dash-board D, and may have suitable bearing at its lower end therein. The upper end of the shaft 80 is provided with a pair of spaced apart ears 81 receiving therebetween the inner end of an operating handle 82 which, by lateral movement may turn the shaft 80, and which may also be swung vertically without moving the shaft. A collar 83 is secured about the upper end of the shaft 80 and engages the upper edge of the bracket 79 to support the shaft 80 and admit of the free turning of the same. The outer end of the bracket 79 is formed with upper and lower pairs of spaced apart ears 84 and 85, each pair being vertically spaced apart and the adjacent lateral portions of the plate, forming the bracket 79, having arcuate slots 86 therein with notches 87' in their lower marginal edge portions at their outer ends. Stop bolts 87 and 88 are secured through the upper and lower portions of the ears 84 and 85 to secure each pair in suitably spaced apart relation and hold the free ends of the plate of the bracket in the desired frictional contact with the shaft 80. The shaft 80 is thus held yieldingly in adjusted position when turned by the operating handle 82. The tubular shaft 80 is also provided in its outer side with a longitudinally extending slot 89 which extends from a point opposite the upper stop bolt 87 to the lower stop bolt 88. The lower end of the shaft 80 is provided with an outwardly extending arm 90 having pivotal connection to one end of a bell-crank 91 suitably pivoted at 92 upon the frame A and having connection at its opposite end with a connecting rod 93 which projects rearwardly and has pivotal engagement at its opposite end to the lug 76 of the shiftable bar 75 by means of a pivoted bar or lever as shown.

Longitudinally slidable within the tubular shaft 80 is a second operating shaft 94 having an arm 95 projecting laterally therefrom near its upper end, the arm 95 extending through the slots 89 and adapted for movement between the lugs 84 and 85 and in the slots 86. A link 96 is pivotally connected at one end to the outer extremity of the arm 95 and at its opposite end to an intermediate portion of the operating handle 82 for shifting the shaft 94 longitudinally upon the vertical swinging movement of the handle 82.

If desired, means may be provided for locking the parts in position when adjusted, the present means comprising a segment 97 having teeth upon its inner side and pivotally connected at one end to the operating handle 82, the teeth of the segment being arranged to interlock with a pin 98 projecting from the outer end of the arm 95. A finger grip 99 projects outwardly from the upper end of the segment 97 at the under side of the operating handle 82 and is normally depressed by a spring 100 which is interposed between the handle 82 and the finger grip. The spring 100 urges the segment 97 into engagement with the pin 98 to hold the operating lever 82 in adjusted position.

The lower end of the operating shaft 94 has pivotal connection to a bell-crank lever 101, the latter being pivotally mounted at 102 upon the frame A and having connection at its opposite end to a connecting rod 103 which is pivotally secured, through a pivoted bar or lever as shown at the its rear end to the lug 65 of the hollow rod or bar 62 of the transmission mechanism.

In the operation of the above specifically described embodiment of this invention, when the parts are adjusted in a position shown in Fig. 1, the clutch elements 26, 38 and 50 are in neutral positions and the clutch member 26 is the only element which turns with the drive shaft 18. To maintain these clutch elements in this neutral arrangement, the operating handle 82 is swung downwardly into the position shown in full lines in Fig. 8 with the arm 95 between the lower flanges or ears 85 of the bracket. The segment 97 engages the pin 98 and locks the parts in this position so that the same cannot be accidentally shifted by vibration or the like.

When it is desired to connect the drive and driven shafts 18 and 19 for the purpose of starting the motor vehicle, the operator grasps the handle 82 and compresses the finger latch 99 thereagainst to release the segment 97 from the pin 98. The handle 82 is now drawn upwardly into the first upper dotted line position shown in Fig. 8 to dispose the arm 95 between the upper and lower pairs of ears 84 and 85, such shifting of the arm 95 drawing the operating shaft 94 upwardly and swinging the bell-crank lever 101, which latter draws the connecting rod 103 forwardly and shifts the hollow bar 62 therewith. This movement of the bar 62 compresses the spring 68 against the sleeve 66 and moves the latter with the bar for shifting the clutch element 26 forwardly into interlocking engagement with the gear-wheel 22. The trains of gears are now set in motion as the gear-wheel 56 upon the counter-shaft 55 is rotated to turn the shaft, and all of the gears mounted thereon are simultaneously turned and operate the various loose gear-wheels upon the driven shaft 19. When all of the gear-wheels are thus interlocked, the handle 82 may be swung laterally to turn the tabular shaft 80 and move the arm 95 in the slot 86, the arm 95 being movable in either direction to rock the bell-crank lever 91 and shift the connecting rod 93 and the bar 75 connected thereto longitudinally. When the bar 75 is moved rearwardly, the clutch element 38 is shifted longitudinally upon the driven shaft 19 into interlocking engagement with the low-speed gear-wheel 42, and when the bar 75 is shifted in the opposite direction, or forwardly, the clutch element 38 is shifted into engagement with the intermediate speed gear-wheel 34. In both instances, the driven shaft 19 is interlocked with the jack-shaft 55, and the latter is driven through the gear-wheel 22 by the drive shaft 18. When the arm 95 is swung in either direction through the slot 86, the arm 95 may be locked in its shifted position by engagement in the notch in the lower marginal edge of the slot 86 for holding the low speed and intermediate gear-wheels 42 and 34 in interlocked position with the driven shaft 19.

To effect a reverse movement of the driven shaft 19, the handle 82 is swung horizontally to its normal intermediate position and moves the arm 95 into axial alinement with the vertical opening between the pairs of lugs or flanges 84 and 85. The handle 82 is now swung upwardly and moves the shaft 94 upwardly to a further extent, compressing the spring 68 and binding the clutch member 26 in interlocking engagement with the gear-wheel 22. This movement of the handle 82 also draws the hollow bar 62 forwardly against the tension of the spring 68 and shifts the rear clutch element 50 into interlocking engagement with the reverse gear-wheel 44. As is clearly shown in Fig. 1, when the parts are in normal inactive positions, the clutch member 50 is held spaced from its adjacent gear wheel 44 a distance at least twice that of the space between the clutch member 26 and the gear wheel 22. This admits the operating means, when moved continuously in the same direction, to first interlock the members 26 and 22 for driving the counter shaft 55 and subsequently interlocking the members 44 and 50 to reversely connect the driven shaft to the counter shaft. The intermediate and high gear clutches are adapted to be interlocked subsequent to the initial movement of the said operating means, and the latter is advanced fully in said direction only when the intermediate and high gear clutches are released as hereinbefore pointed out. The driven shaft 19 is now revolved in an opposite direction through the gear-wheels 59 and 44 and the intermediate pinion 60, which effects a reverse movement of the gear-wheel 44.

When a direct drive is desired, the handle 82 is swung downwardly to its fullest extent whereupon the opening shaft 94 is moved downwardly through the tubular shaft 80 sufficiently to force the bar 62 rearwardly to engage the collar 67 against the sleeve 66 and shift the clutch member 26 out of engagement with the gear-wheel 22 and into interlocking engagement with the flange of the collar 30. As the collar 30 is fixed upon the driven shaft 19, the clutch member 26 forms a direct connection between the drive and driven shafts to operate the latter by the former exclusive of the trains of gears. The locking pin 71 is shifted rearwardly by the movement of the sleeve 66 and engages in an adjacent depression 73 of the gear-wheel 34 to hold the latter from turning and thus arrest the movement of all of the gear-wheels.

It is of course understood that various changes and modifications may be made in the details of construction and design of the above specifically described parts of the invention to adapt the same to various installations and conditions met with in use, such modifications and changes being restricted only by the scope of the following claims:

What is claimed is:

1. In transmission mechanism, the combination of drive and driven shafts, a counter shaft, connections between the counter shaft and the drive and driven shafts and including each a gear wheel loose upon its respective drive and driven shaft, a clutch element on the drive shaft adapted to interlock with the adjacent gear wheel, a second clutch element on the driven shaft adapted to interlock with its gear wheel, and shifting means for the clutch elements including yieldably connected devices each having engagement with one of the clutch elements, and adapted to be shifted in one direction for interlocking one of the clutch members with its gear wheel and to be further shifted in the same direction for interlocking the other clutch element with the other gear wheel while maintaining the first clutch element and the gear wheel interlocked.

2. In transmission mechanism, the combination of drive and driven shafts, a counter shaft, connections between the counter shaft and the drive and driven shafts and each including a loose gear wheel, a clutch element for each loose gear wheel adapted to interlock therewith, shifting means for the clutch elements and including yieldably connected devices each having engagement with one of the clutch elements and arranged to normally maintain the clutch elements out of engagement with their respective gear wheels and with one element further removed from its gear wheel than the other element from the other gear wheel, whereby shifting of said means in one direction first interlocks the said other element with said other gear wheel and further movement in the same direction interlocks the first element with its gear wheel while maintaining said other element and gear wheel interlocked, other normally released connections between the counter shaft and the driven shaft connected to the drive shaft by said last named interlocked element and gear wheel, and means for coupling said other connection and adapted to be actuated subsequent to the initial movement of the said shifting means.

3. In transmission mechanism, the combination of drive and driven shafts, a countershaft, gear-wheels fixed upon the countershaft, gear-wheels loose upon the drive and driven shafts, a reverse gear-wheel loose upon the driven shaft and having connection with one of the gear-wheels on the counter-shaft, a clutch element shiftable upon the drive shaft for interlocking engagement with the gear-wheel thereon to drive all of said gear-wheels by the drive shaft, a second clutch element on the driven shaft adapted for interlocking engagement with the adjacent gear-wheel selectively to lock the desired gear-wheel to the driven shaft for turning the same, a third clutch element on said driven shaft adapted for interlocking engagement with the reverse gear-wheel for operating the driven shaft in a reversed direction, and a pair of concentric rods extending longitudinally of the drive and driven shafts and having connection with the clutch members to independently shift the same.

4. In transmission mechanism, the combination of drive and driven shafts, a counter shaft, normally loose sets of gears between the driven and counter shafts for driving the driven shaft in one direction at different speeds relative to the drive shaft, a reverse set of gears between the driven and counter shafts, a normally loose connection between the drive and counter shafts, a rod engaging said connection for interlocking the drive and counter shafts when the rod is moved in one direction, means for selectively connecting the said first sets of gears between the driven and counter shafts, and means carried by the rod engaging the reverse set of gears for interlocking the same between the driven and counter shafts upon the further movement of the rod in said direction.

5. In transmission mechanism, the combination of drive and driven shafts, a countershaft, gear-wheels fixed upon the countershaft, gear-wheels loose upon the drive and driven shafts, a clutch member upon the drive shaft for interlocking engagement with the gear-wheel thereon for actuating all of the gear-wheels, clutch members upon the driven shaft for selectively interlocking the loose gear-wheels thereto, a coöperating clutch element upon the driven shaft adapted for interlocking engagement with said first clutch member when released from the gear-wheel of the drive shaft to interlock the drive and driven shafts to the exclusion of the gear-wheels, and locking means operable upon the shifting of said first clutch member for holding all of said gear-wheels from rotation.

6. In transmission mechanism, the combination of drive and driven shafts, a counter-shaft, gear-wheels fixed upon the counter-shaft, corresponding gear-wheels loose upon the drive and driven shaft and connected to said first gear-wheels, a reversing pinion interposed between one of said fixed gear-wheels and one of said loose gear-wheels for driving the latter in a reversed direction, a clutch member on the drive shaft, a reversing clutch member on the driven shaft, operating means connected to said clutch members adapted to be shifted in one direction for engaging the first clutch member with the gear-wheel upon the drive shaft for driving all of said gear-wheels and adapted for further movement in said direction to interlock the reversing clutch member with the reversed gear-wheel, an intermediate clutch member upon the driven shaft arranged between the intermediate gears thereon, and means for shifting said intermediate clutch member to selectively engage the adjacent gear-wheel for driving the driven shaft, said first clutch member upon the drive shaft being adapted to be shifted in a reversed direction for interlocking engagement with the driven shaft and to release the gear-wheels for directly connecting the drive and driven shafts to the exclusion of the gear-wheel.

7. In transmission mechanism, the combination of drive and driven shafts, a counter-shaft, gears fixed to the counter-shaft, gears loose upon the drive and driven shafts, a clutch element upon the drive shaft, a complemental clutch element upon the adjacent end of the driven shaft, an intermediate clutch member upon the driven shaft between intermediate gears thereon, a reversing pinion interposed between one of the fixed gears and one of the loose gears, a reversing clutch element mounted on the driven shaft, a hollow bar connected at one end to the reversing clutch member, a yieldable connection between said hollow bar and the first clutch member upon the drive shaft, means for shifting said hollow bar in one direction to interlock the gear upon the drive shaft thereto for operating all of said gears and for further shifting the bar in said direction for interlocking the reverse clutch member with the reverse gear to drive the driven shaft through said gears in a reverse direction, and a second bar slidable within the hollow bar having connection with the intermediate clutch member and adapted to be shifted in opposite directions for selectively interlocking the intermediate gears to the driven shaft, said hollow bar being adapted to be shifted in an opposite direction for interlocking said first clutch member with the complemental clutch element of the driven shaft and to release the gears from the drive shaft.

8. In transmission mechanism, the combination of drive and driven shafts, a counter-shaft, gears fixed to the counter-shaft, gears loose upon the drive and driven shafts, a clutch element mounted on the drive shaft, a complemental clutch element mounted on the adjacent end of the driven shaft, an intermediate clutch member mounted upon the driven shaft between adjacent loose gears, a reversing pinion interposed between one of the fixed gears and one of the loose gears, a reversing clutch member mounted upon the driven shaft, a longitudinally shiftable bar connected to said reversing clutch member, a yieldable connection between said first clutch member and the bar, means for shifting said bar longitudinally in one direction to interlock said first clutch member with the gear-wheel on said drive shaft for turning all of said gears and for further shifting the bar in the direction to engage said reversing clutch member with the reversely operated gear on the driven shaft, and a second bar connected to the intermediate clutch member for movement in opposite directions to selectively interlock the clutch member to the adjacent gears.

9. In a transmission mechanism, the combination of drive and driven shafts, a counter-shaft, gears fixed to the counter-shaft, gears loose upon the drive and driven shafts, and meshing with the gears on the counter-shaft, a clutch element mounted upon the drive shaft in spaced relation to an adjacent gear upon the drive shaft, clutch elements on the driven shaft arranged adjacent to said loose gears of the driven shaft, a longitudinally shiftable bar having a fork on one end for engagement with one of said clutch members on the driven shaft, a sleeve on said bar having a fork engaging a second clutch member on the driven shaft and provided with a locking finger, a stop collar on said bar for engagement with one end of the sleeve to limit the sliding movement thereof in one direction, a tension spring adjustably mounted on the bar adjacent the opposite end of the sleeve to hold the latter yieldingly against the collar, said first fork of the bar being spaced from the adjacent gear-wheel substantially twice the distance of the space between the fork of the collar and its adjacent gear-wheel, means for shifting said bar longitudinally in one direction to engage the second clutch member with its adjacent gear-wheel and for further moving the bar in the same direction for compressing said spring and engaging the first clutch member within the adjacent gear-wheel, said operating means being adapted to move the bar in an opposite direction to release both of said clutches from their respective gear-wheels and to interlock the second clutch with said clutch element upon the driven shaft for directly connecting the drive and driven shafts, said finger being adapted to be moved into interlocking relation with an adjacent gear-wheel to hold all of the gear-wheels from turning, a third clutch member arranged between intermediate gear-wheels upon the driven shaft, and a second bar having a fork connected to said third member for shifting the same in opposite direction to selectively interlock the gear-wheels with the driven shaft.

10. In transmission mechanism, the combination of drive and driven shafts, a counter shaft, gears fixed to the counter-shaft, gears loose upon the drive and driven shafts, clutch members on the drive and driven shafts and adapted to be longitudinally shifted thereon for interlocking a selective loose gear thereto, a bar connected to several of the clutch members, a second bar connected to other of the clutch members, a pair of concentric operating shafts, a handle connected to said shaft adapted to turn one of the shafts and shift the other shaft longitudinally thereof, and connections between said bars and said shafts for shifting said clutch elements for selectively engaging the clutch members by the operation of the handle.

11. In transmission mechanism, the combination of a plurality of closely spaced apart rotating gear-wheels, clutch elements arranged between the gear-wheels, bars connected to the clutch elements for shifting the same, concentric shafts connected between the concentric shafts and the bars, a handle mounted upon the outer shaft for turning the same to shift the bars, and a connection between said handle and the inner shaft for moving the latter upon the movement of the handle longitudinally of the outer shaft to shift the other bar.

12. In transmission mechanism, the combination of a plurality of rotating gears arranged in closely spaced apart relation, clutch members arranged between the gears, a bar connected to some of said clutch members, a second bar connected to the other of said clutch members, a pair of concentric shafts, a handle pivotally mounted upon the outer shaft for turning the same in opposite directions and shifting the bar connected thereto in opposite directions, a link connecting the handle to the inner shaft for moving the latter longitudinally upon the swinging of the handle for shifting the adjacent bar in opposite directions, and a guide for said handle to admit the turning thereof only when swung into a desired position of adjustment.

13. In transmission mechanism, the combination of a plurality of gear-wheels arranged in spaced apart relation, clutch members arranged between the gear-wheels, a bar connected to certain of said clutch members, a second bar connected to other of said members, a pair of concentric shafts having connection with said bars, a handle pivoted upon the outer shaft to swing in a plane longitudinally of the shaft and to turn with the shaft in opposite lateral positions, an arm projecting from the inner shaft through one side of the outer shaft, a link connecting the outer end of the arm to said handle for shifting the inner shaft upon the swinging of the handle, and a guide arranged above the outer shaft having longitudinally spaced apart pairs of spaced ears for receiving said arm therebetween, said handle being adapted to shift said arm longitudinally between the ears for longitudinally shifting the inner shaft and being adapted to swing laterally between the upper and lower pairs of ears when registering with the space therebetween to turn the outer shaft.

14. In transmission mechanism, the combination of a plurality of gears arranged in closely spaced relation, clutches disposed between said gears, a bar connected to certain of said clutches, a second bar connected to other of said clutches, a pair of concentric shafts connected respectively to the bars, a handle pivotally connected to the outer shaft adapted to swing in the longitudinal plane thereof and to turn laterally with the shaft, an arm upon the inner shaft projecting through one side of the outer shaft, a link connecting the arm to the handle, a guide mounted on the outer shaft and having a longitudinal and a transverse way therein for limiting the longitudinal and rotary movement of the arm, said handle being adapted to be turned laterally in opposite direction for turning the outer shaft when the arm registers with the lateral way of the guide, and being adapted to be swung longitudinally of the shaft for moving the arm in the longitudinal way when registering therewith for moving the inner shaft longitudinally, and means for locking the handle in adjusted position.

15. In transmission mechanism, the combination of drive and driven shafts, a counter shaft, gear wheels fixed upon the counter shaft, gear wheels loose upon the drive and driven shafts and meshing with the gear wheels on the counter shaft, a shiftable clutch element on the drive shaft adapted when moved in one direction for interlocking engagement with the gear wheel thereon for connecting the drive and counter shafts, a coöperating clutch element fixed upon the driven shaft for interlocking engagement with said first clutch element when the latter is moved in the opposite direction, for directly connecting the drive and driven shafts to the exclusion of the gear wheels, a rod connected to the shiftable clutch element for shifting the latter into engagement with its adjacent gear wheel when the rod is moved in one direction, selective clutch elements between the driven shaft and the loose gear wheels thereon for interlocking the desired loose gear wheel to the driven shaft for driving the latter when the counter shaft is connected to the drive shaft, reverse gear wheels between the counter and driven shafts and including a loose wheel on the driven shaft, a reverse clutch element on the driven shaft, and a connection between said rod and the reverse clutch element for reversely connecting the driven shaft to the counter shaft when said rod is moved farther in said direction, said rod being adapted to be moved in an opposite direction for releasing the said clutch element and freeing the counter shaft from the drive and driven shafts and for directly coupling the latter together.

MATTHEW C. OSTER.

Witnesses:
F. H. WENDT,
EARL H. McAULEY.